(No Model.)
A. A. HIRSH.
DISPLAY STAND.
No. 537,771. Patented Apr. 16, 1895.
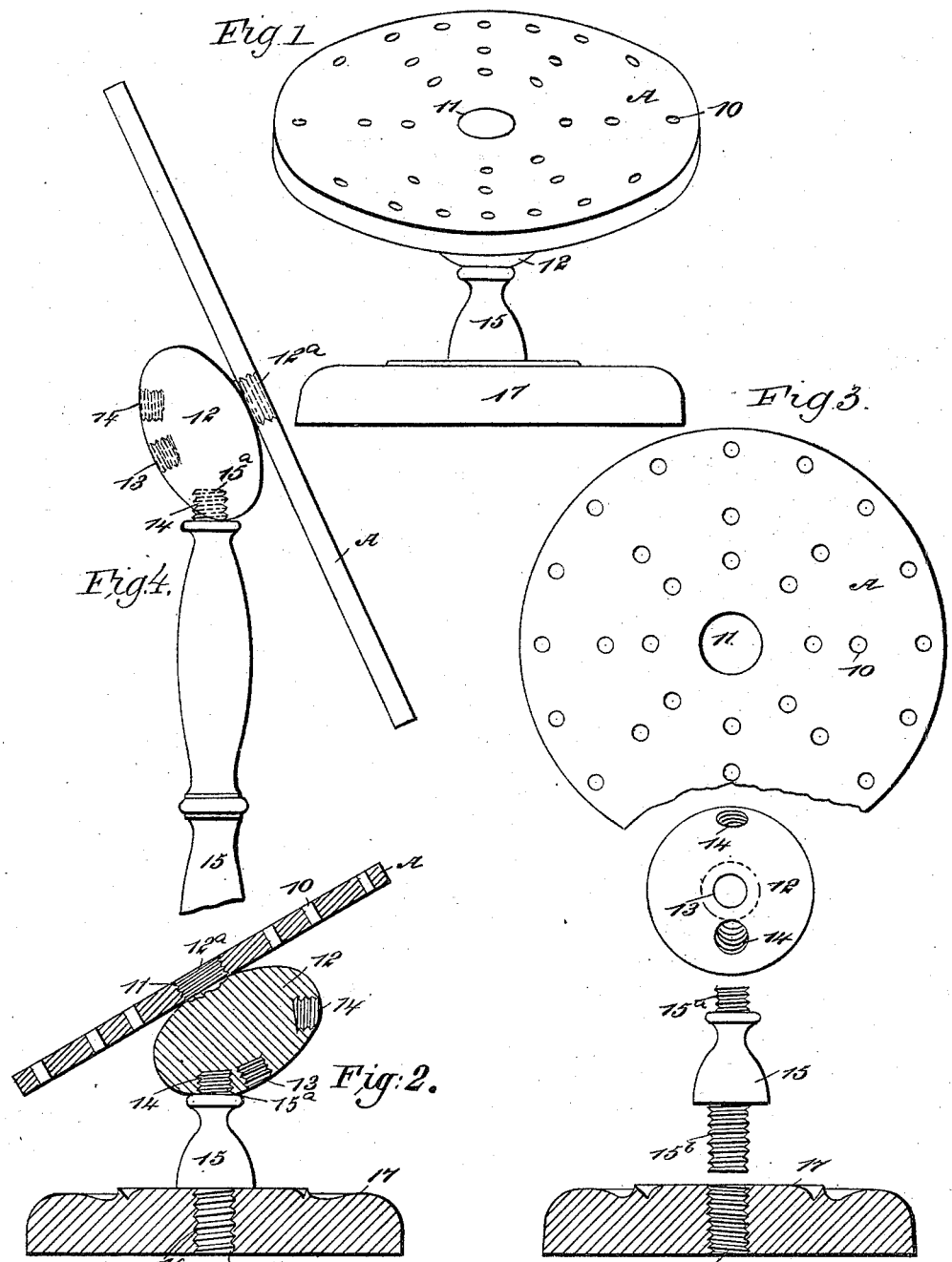
WITNESSES:
INVENTOR
BY
ATTORNEYS.

UNITED STATES PATENT OFFICE.

ALBERT A. HIRSH, OF NEW YORK, N. Y.

DISPLAY-STAND.

SPECIFICATION forming part of Letters Patent No. 537,771, dated April 16, 1895.

Application filed December 12, 1894. Serial No. 531,546. (No model.)

*To all whom it may concern:*

Be it known that I, ALBERT A. HIRSH, of New York city, in the county and State of New York, have invented a new and Improved Stand for the Display of Flowers, Feathers, and Like Articles, of which the following is a full, clear, and exact description.

My invention relates to an improvement in stands for the display of flowers, feathers and like articles, being especially designed for the display of artificial flowers.

The object of this invention is to provide a stand in which the table may be adjusted to any inclination desired, and whereby the said table may be held in the desired adjustment without the aid of set screws, or like fastening devices.

Another object of this invention is to provide a stand for the display of flowers and similar articles which may be expeditiously and conveniently adjusted or changed to bring the table a predetermined distance from the support of its base, and whereby when the display stand is not needed it may be readily taken apart and packed in small compass, and whereby further a table of any desired size may be used in connection with the base, or whereby any table may be made to approach the base more or less closely.

The invention consists in the novel construction and arrangement of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a front elevation of the improved stand. Fig. 2 is a vertical section through the stand. Fig. 3 is a view of the various parts of the stand disconnected, the base being in section and a portion of the table broken away; and Fig. 4 is a detail view of the table top with an elongated shank, the shank being broken off.

In carrying out the invention the table A may be of any desired exterior contour and of any required size. In the drawings the table is shown as of a circular shape, and it is provided with a number of apertures 10, adapted to receive the stems of flowers, feathers, or other articles to be displayed, and consequently these openings 10 may be bored straight or diagonally in the table, as may be found most convenient.

The table is further provided with a large opening 11 at its center, the wall of this opening being threaded to receive the threaded stem $12^a$ of a block 12. This block is preferably of a spherical or oval shape, and may be considered, when attached to the table, as an extension thereof. The block 12 is provided with an axial threaded opening 13, and two or more threaded openings 14 located at opposite sides of the axial opening, and at an angle thereto. Either of the openings 14 or 13 is adapted to have screwed therein the threaded extremity $15^a$ of a shank 15, the said shank being of any desired length, and the opposite extremity of the said shank is provided with a reduced and exteriorly threaded section $15^b$, which is adapted to be screwed into an opening 16, the wall of which is threaded, the said opening being made in a base 17, the latter being of any desired shape.

Any material desirable may be employed in the construction of this display stand and the table may be supported by the shank in a horizontal position, or at any desired angle, by placing the shank in the appropriate aperture in the block 12.

It will be observed that the various parts are separable, as is particularly shown in Fig. 3, and consequently a long or a short shank may be used, or a table of any desired size; and a block 12 may be employed having a greater or a less number of openings than is illustrated in the drawings.

This display stand is particularly adapted for the display of such articles as flowers, feathers, &c., to be grouped in bouquet form, and may be of a size adapting it to be placed in a show-case, or displayed upon a case, or in a window.

Having thus described my invention, I claim as new and desire to secure by Letters Patent—

A stand for displaying flowers and the like, comprising a table top provided with a central threaded aperture and a series of apertures to receive the stems of the articles to be displayed, a block having a threaded stem fitting in the threaded aperture of the table top, and provided with a plurality of threaded apertures, a base provided with a threaded aperture, and a shank having threaded ends fitting in the aperture of the base and in one of the apertures of the said block, substantially as described.

ALBERT A. HIRSH.

Witnesses:
H. K. CULVER,
C. SEDGWICK.